UNITED STATES PATENT OFFICE 1,961,628

NEW INDIGOID VAT DYESTUFFS

Werner Zerweck and Wilhelm Hechtenberg, Frankfort - on - the - Main - Fechenheim, Germany, assignors to General Aniline Works, Inc., New York, N. Y., a corporation of Delaware No Drawing. Application July 22, 1931, Serial No. 552,554. In Germany August 1, 1930

3 Claims. (Cl. 260—48)

Our present invention relates to the new indigoid vat dyestuffs corresponding to the formula:

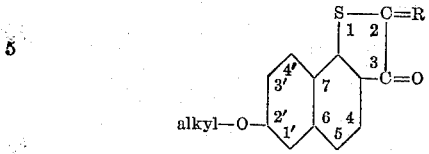

(wherein R means an indigoid dyestuff component).

Of a special value are those of these dyestuffs which contain as second component (R in the above formula) the residue of 3-hydroxy-thionaphthene or of 2.1-naphthisatine or of a nuclear substitution product thereof. The dyestuffs derived from 2'-methoxy-6.7-benzo-3-hydroxy-thionaphthene and a 3-hydroxy-thionaphthene of the benzene series dye the vegetable fiber from the vat yellowish to reddish brown shades of a good fastness; those derived from 2'-methoxy-6.7 - benzo - 3 - hydroxy-thionaphthene and 2.1-naphthisatine or a halogen 2.1-naphthisatine yield olive to olive brown fast dyeings.

The dyestuffs being object of our present invention may be prepared in the following manner:

A 2-alkoxy-6-amino-naphthalene is converted according to customary methods into 2'-alkoxy-6.7-benzo-3-hydroxy-thionaphthene. This compound is condensed with an indigoid dyestuff component, especially with a 2-anil of a 2.3-diketo-di-hydro-thionaphthene or with a 2.1-naphthisatine or an α-chloride or α-anil thereof. Also the 2-alkoxy-6.7-benzo - 3 - hydroxy - thionaphthene itself may be first converted into a corresponding anil and the latter condensed with a hydroxy-thionaphthene.

In order to further illustrate our invention the following examples are given, the parts being by weight and all temperatures in centigrade degrees. But we wish it to be understood that we are not limited to the particular conditions nor specific products mentioned therein.

Example 1

23 parts of 2'-methoxy-6.7-benzo-3-hydroxy-thionaphthene (crystallizing from petrol in nearly colorless crystals melting at 173°) are boiled in about 500 parts of glacial acetic acid with 28 parts of the 2-(4'-dimethyl-amino) anil of 3-keto-2.3-dihydro-thionaphthene. When the formation of the dyestuff is finished the precipitate is filtered and washed with water. It represents when dry a reddish brown powder, soluble in concentrated sulfuric acid with a blue tint, dyeing cotton from a yellow vat bright reddish brown shades. It corresponds to the formula:

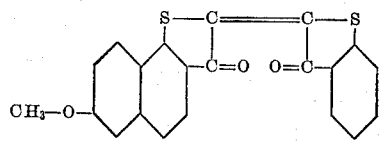

The same dyestuff is obtained by condensing the anil of 2'-methoxy-6.7-benzo-3-keto-2.3-dihydro-thionaphthene with 3-hydroxy-thionaphthene.

Example 2

By replacing in example 1, 3-hydroxy-thionaphthene by 3 - hydroxy - 4 - methyl-6-chloro-thionaphthene a more reddish, by 3-hydroxy-6-methoxy-thionaphthene a bright yellowish brown dyestuff is obtained.

Example 3

32 parts of the α-naphthylimide of 2.1-naphthisatine are stirred at about 95° for some time in 500 parts of glacial acetic acid with 23 parts of 2'-methoxy - 6.7 - benzo-3-hydroxy-thionaphthene. The formed dyestuff is filtered, washed and dried. It yields from a yellow vat intense olive brown shades. It corresponds to the formula:

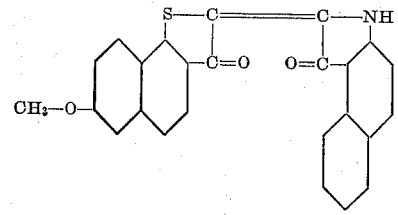

Example 4

27 parts of monobromo-2.1-naphthisatine are warmed in about 400 parts of chloro-benzene with 26 parts of phosphorus pentachloride. The solution of the α-chloride thus obtained is mixed with a solution of 23 parts of 2'-methoxy-6.7-benzo-3-hydroxy-thionaphthene in chlorobenzene. After warming for some time to 80–85° the formed dyestuff is filtered, washed with chloro-benzene and dried. It dissolves in concentrated sulfuric acid with a bluish violet tint and dyes vegetable fibers from a yellow vat olive shades.

Similar dyestuffs are produced by using instead monobromo - 2.1 - naphthisatine, dibromo - 2.1- naphthisatine or instead of 2'-methoxy-6.7-benzo-3-hydroxy-thionaphthene, 2'-ethoxy-6.7-benzo-3-hydroxy-thionaphthene.

We claim:

1. The indigoid vat dyestuff corresponding to the formula:

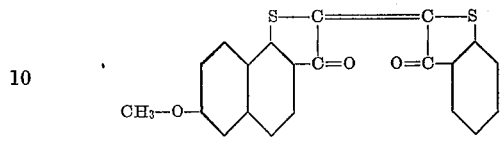

which compound dyes vegetable fibers from a yellow vat bright reddish brown shades.

2. The indigoid vat dyestuff corresponding to the formula:

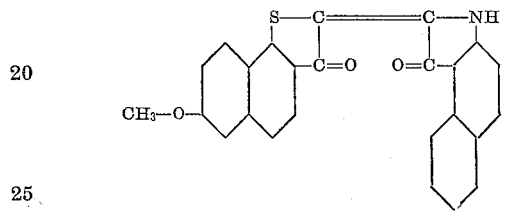

which compound dyes vegetable fibers from a yellow vat intense olive brown shades.

3. The indigoid vat dyestuffs corresponding to the general formula:

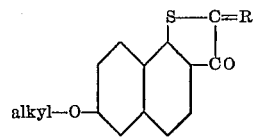

wherein R means an indigoid dyestuff component of the group consisting of the condensed radical of 3-hydroxy-thionaphthene which may contain chlorine, methyl or methoxy, of 2.1-naphthisatine and of halogen-2.1-naphthisatine which compounds dye vegetable fibers yellowish to olive-brown shades.

WERNER ZERWECK.
WILHELM HECHTENBERG.